United States Patent
Bernard et al.

(10) Patent No.: US 9,638,275 B2
(45) Date of Patent: *May 2, 2017

(54) SPRING-EQUIPPED MEMBER FOR GUIDING A DISC BRAKE PAD AND DISC BRAKE PROVIDED WITH SUCH GUIDING MEMBERS

(71) Applicant: Robert Bosch GmbH, Stuttgart (DE)

(72) Inventors: Simon Bernard, Le Perreux s/Marne (FR); Sandra Merrien, Fontenay Sous Bois (FR); Roger Mahoudeaux, La Blanc Mesnil (FR)

(73) Assignee: Robert Bosch GmbH, Stuttgart (DE)

( * ) Notice: Subject to any disclaimer, the term of this patent is extended or adjusted under 35 U.S.C. 154(b) by 109 days.

This patent is subject to a terminal disclaimer.

(21) Appl. No.: 14/357,099

(22) PCT Filed: Dec. 14, 2012

(86) PCT No.: PCT/EP2012/075602
§ 371 (c)(1),
(2) Date: May 8, 2014

(87) PCT Pub. No.: WO2013/087868
PCT Pub. Date: Jun. 20, 2013

(65) Prior Publication Data
US 2014/0305754 A1    Oct. 16, 2014

(30) Foreign Application Priority Data
Dec. 15, 2011  (FR) ...................................... 11 03876

(51) Int. Cl.
*F16D 65/097*    (2006.01)
*F16D 65/00*    (2006.01)

(52) U.S. Cl.
CPC ..... *F16D 65/0977* (2013.01); *F16D 65/0006* (2013.01); *F16D 65/0972* (2013.01); *F16D 65/0978* (2013.01)

(58) Field of Classification Search
CPC ............ F16D 65/0972; F16D 65/0973; F16D 65/0974; F16D 65/0977; F16D 65/0978
See application file for complete search history.

(56) References Cited

U.S. PATENT DOCUMENTS 4,180,148 A     12/1979 Souma
5,699,882 A  *  12/1997 Ikegami .............. F16D 65/0972
                                                188/205 A (Continued)

FOREIGN PATENT DOCUMENTS

CN    101063470 A    10/2007
FR    2 904 990 A1    2/2008

(Continued)

OTHER PUBLICATIONS

Machine translation of JP 2002-039239 (no date).*

(Continued)

*Primary Examiner* — Nicholas J Lane
(74) *Attorney, Agent, or Firm* — Maginot, Moore & Beck LLP (57) ABSTRACT

A brake calliper has two arms, each including a housing and a stub. A member for guiding a disc brake pad is disposed in the housing, and is secured by lugs to a front of the stub. The member includes a body having a U-shaped section formed by an inner radial surface, a base, an outer radial surface, and includes a tongue that extends beyond an edge of the body, and that is configured to be hooked in the housing and to fully lock the member in the arm. An inner side of the body is bordered by an inner front supporting surface disposed against an inner surface of the arm. An outer front supporting surface is disposed against the front of (Continued)

the stud, extends into a hairpin damper spring extending towards the front of the stud, and is bordered on each side by a tongue that form side end-stops.

12 Claims, 4 Drawing Sheets

(56) References Cited

U.S. PATENT DOCUMENTS

| | | | | |
|---|---|---|---|---|
| 6,296,085 B1 | * | 10/2001 | Yukoku | F16D 65/0972 188/73.36 |
| 2009/0159376 A1 | * | 6/2009 | Rossignol | F16D 65/095 188/73.38 |
| 2014/0374202 A1 | * | 12/2014 | Mahoudeaux | F16D 55/2262 188/250 E |

FOREIGN PATENT DOCUMENTS

| | | | |
|---|---|---|---|
| FR | 2 925 634 A1 | | 6/2009 |
| JP | 2001-336554 A | | 12/2001 |
| JP | 2002039239 A | * | 2/2002 |
| JP | 2009209961 A | * | 9/2009 |
| JP | 2010196875 A | * | 9/2010 |
| KR | 10-2010-0126971 A | | 12/2010 |
| WO | 01/31223 A1 | | 5/2001 |
| WO | 2005/064194 A1 | | 7/2005 |

OTHER PUBLICATIONS

Machine translation of JP 2009-209961 (no date).*
Machine translation of JP 2010-196875 (no date).*
International Search Report corresponding to PCT Application No. PCT/EP2012/075602, mailed Apr. 15, 2013 (German and English language document) (7 pages).

* cited by examiner

SPRING-EQUIPPED MEMBER FOR GUIDING A DISC BRAKE PAD AND DISC BRAKE PROVIDED WITH SUCH GUIDING MEMBERS

This application is a 35 U.S.C. §371 National Stage Application of PCT/EP2012/075602, filed on Dec. 14, 2012, which claims the benefit of priority to Serial No. FR 1103876, filed on Dec. 15, 2011 in France, the disclosures of which are incorporated herein by reference in their entirety.

The present disclosure relates to a guiding member for a disk brake pad in a cap which is composed of two U-like arms connected by two bars, each arm having at the two ends thereof an axial housing which has a substantially rectangular cross-section and which is bounded by a base, an internal radial surface and an external radial surface and above the housing, the guiding member being formed by a spring steel band which is folded in order to be fixed to the stud and which is positioned in the housing of the arm and to receive in an axially sliding manner the corresponding lug of the pad, the lug being provided with a radial spring in order to be guided and pressed by the guiding member and the housing.

Such a guiding member of a brake pad in the housing of a cap of a disk brake makes it easier to displace the brake pad during braking.

The disclosure also relates to a disk brake provided with such guiding members according to disclosure.

BACKGROUND

In a vehicle provided with disk brakes, each wheel to be braked comprises a brake disk which is fixedly joined to the wheel and brake pads which are fixedly joined to the chassis of the vehicle and which brake the disk by friction. The brake comprises a calliper having a cap having at each side of the brake disk a U-like branch which carries a brake pad and each pad is movable perpendicularly relative to the plane of the disk, in a state guided by the two ends (lugs) thereof in the housings of the arms of the cap.

During braking, the pads are moved in the direction tangential to the disk and the lugs move into abutment, sometimes abruptly, against the bottom of their guiding housing, thereby bringing about a noise referred to as a "clonk" or tapping. In order to damp the impact of the lugs in their housing and thereby to attenuate the noise, there is provided a spring between each lug and the housing thereof and the damping is obtained by the deformation of the spring whose shape is adapted to the force applied by the brake pad during its tangential displacement.

Furthermore, the pad must be able to move axially by its lugs sliding in the retention spring which combines a function as a slide and a function as a spring.

Once the pad is in position, the slide system becomes deformed as a result of the geometric defects and the spring effect and brings about a spring/rigidity effect which has an influence on the generation of noise during the braking.

Such guiding members for disk brake pads are already known according to the documents WO 01/31223 and FR 07 09 124.

SUMMARY

An object of the present disclosure is to improve such guiding members for disk brakes in order to improve their efficiency and to reduce the noise during braking.

To this end, the disclosure relates to a guiding member of the type defined above, characterized by a body which has a cross-section in the form of a U on its side and which is substantially rectangular in order to be positioned in the housing and which is continued by a front abutment surface which moves into abutment against the front surface of the stud and which carries two tongues in order to form lateral stops which extend at one side and the other of the stud and a hairpin-like shock-absorbing spring which moves toward the front in order to resiliently press against the side of the pad above the lug, and by a front internal abutment surface which moves into abutment against the internal surface of the arm and which receives the face of the pad under the lug, the body having an external radial surface which moves into abutment against the upper surface of the housing, followed by a base which moves into abutment against the base of the housing and an internal radial surface which is provided with a locking tongue in order to press against and become engaged with the lower surface of the housing.

The guiding member according to the disclosure is excellently fixed to the arm of the cap both by being retained on the stud and by being engaged by means of the locking tongue in the housing of the arm. The U-like form of the body of the guiding member provides good guiding contact for the auxiliary spring or radial spring with which each lug of the pad is provided and which promotes not only the sensitivity of the braking movement but especially the clearance of the pad with respect to the surface of the disk at the end of braking in order to prevent any residual contact, which is a source of losses owing to friction.

The shock-absorbing spring applies a moderate force which pushes the brake pad into abutment against the downstream support thereof in the direction of rotation of the brake disk and with zero play which prevents any noise during braking.

At the upstream side, the play is at a maximum.

The force applied to the shock-absorbing spring is independent of the other actions applied to the guiding member. It is also necessary to emphasise that the reaction on the shock-absorbing spring varies weakly during the wear of the linings of the pads.

The guiding member according to the disclosure constitutes the solution which ensures both the excellent quality of the guiding of the lug of the pad and retains the pad relative to the arm of the cap in order to prevent any noise connected with an impact at the start of braking.

Finally, the guiding member is installed in a particularly simple manner in the housing of the arm.

The rounded edge against which the corresponding side of the pad presses not only ensures guiding contact which prevents any jamming, even point-like jamming, or sticking of the shock-absorbing spring on the surface of the pad, in particular for the return movement of the pad at the end of braking, which movement is particularly sensitive. Furthermore, this inwardly curved surface constitutes a complementary spring with respect to the hairpin-like shock-absorbing spring because, in the event of compression of the hairpin-like shock-absorbing spring, the rounded edge of the abutment surface will also act by means of deformation to damp the impact for a reverse rotation, with backward travel.

According to an advantageous feature, the two lateral stops are constituted by tongues which are cut from the metal sheet at one side and the other of the hairpin-like shock-absorbing spring and which are bent toward the stud.

According to another advantageous feature, the locking tongue is cut and resiliently shaped from the bottom segment and the internal segment of the body, substantially at the centre of the axial length of the band forming the guiding member.

This embodiment is advantageous because the whole of the guiding member is cut from a single spring steel band and is then shaped by resilient bending to a greater or lesser extent in accordance with the rigidity or resilience to be imparted to each portion of this guiding member.

According to an advantageous feature, the end rounded in accordance with a cylindrical shape of the hairpin-like shock-absorbing spring comprises two guiding extensions which are curved toward the rear in order to facilitate the engagement of the edge of the pad against the rounded edge of the hairpin-like shock-absorbing spring.

This embodiment most particularly facilitates the engagement of the pad with the two lugs thereof in the respective housing of the arm, each housing being provided with a guiding member as defined above.

According to another advantageous feature, the folding edge between the third segment of the body and the internal branch comprises a longitudinal cutout over a large portion of the axial length thereof, allowing the material at the ends to remain.

The disclosure also relates to a disk brake provided with guiding members as defined above and more particularly a disk brake whose housings upstream of the arms are each provided with a guiding member comprising:
a body which has a cross-section in the form of a U on its side and which is substantially rectangular in order to be positioned in the housing of the arm of the cap and which is continued by
a front external abutment surface which moves into abutment against the front surface of the stud of the arm and which carries two tongues in order to form lateral stops which extend at one side and the other of the stud and a hairpin-like shock-absorbing spring which moves toward the front in order to resiliently press against the side of the pad above the lug, and by
a front internal abutment surface which moves into abutment against the internal surface of the arm and which receives the face of the pad under the lug,
the body having an external radial surface which moves into abutment against the upper surface of the housing, followed by a base which moves into abutment against the base of the housing and an internal radial surface which is provided with a locking tongue in order to press against and become engaged with the lower surface of the housing.

BRIEF DESCRIPTION OF THE DRAWINGS

The present disclosure will be described in greater detail below with reference to an embodiment of a guiding member of a disk brake pad according to the disclosure illustrated in the appended drawings, in which.

DETAILED DESCRIPTION

Figure 1:
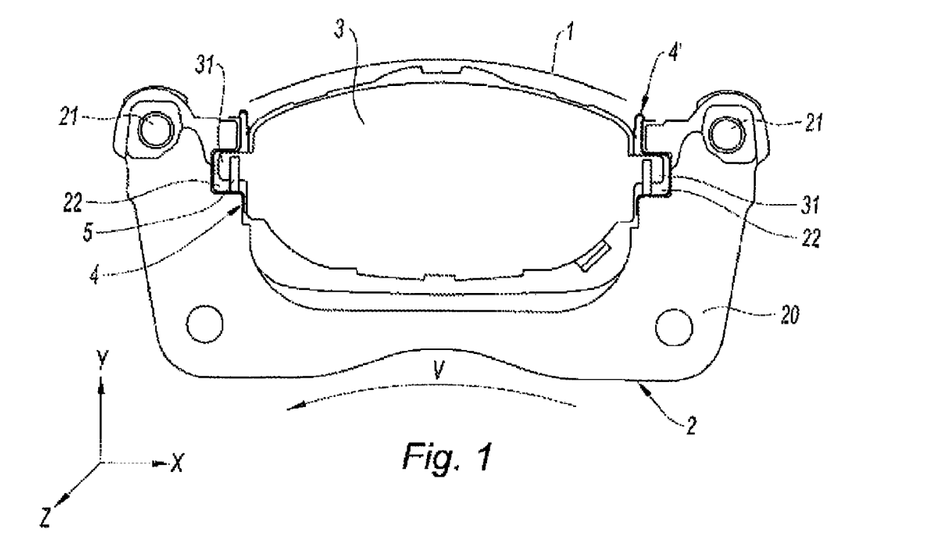
FIG. 1 is a side view of a disk brake cap which is provided with two guiding members and a brake pad.

FIG. 1 generally shows a brake disk 1 which is straddled by a cap 2 which comprises two arms 20 connected by two bars 21. Those two U-like arms 20 extend at one side and the other of the disk 1 and each carry a brake pad. The brake pads 3 are provided at the ends thereof with lugs 31 for being assembled in the housings 22 of each arm, by means of a guiding spring 4, 4' with which each housing 22 is provided and which cooperates with the lug 31 of the pad, which is itself provided with an auxiliary spring 5.

In order to facilitate the description, the orientation defined by the references X, Y, Z indicated in FIG. 1 will be adopted.

The direction Z is the axial direction perpendicular to the plane of the Figure and parallel with the axis of the disk 1.

The direction Y is the radial direction, that is to say, a direction passing through the axis of the disk, the external side and the internal side being defined in this direction.

The direction X corresponds to the lateral direction contained in the plane of FIG. 1 and perpendicular to the radial direction Y. In fact, the direction X is the tangential direction, the upstream side and the downstream side corresponding to the direction of rotation of the disk.

The lugs 31 at the two ends of the pad 3 slide axially in the guiding springs 4, 4', that is to say, perpendicularly to the plane of FIG. 1.

The function of the guiding springs 4, 4' is to guide the pad for braking and the return thereof to a position out of contact with the brake disk and to damp the impact of the lugs against the base of each housing 22 when the pads 3 are carried by the disk 1 during a braking operation. The damping of the impact results from the deformation of the guiding members 4, 4' under the force applied by the pads 3. If the direction of rotation of the disk 1 is given by the curved arrow V which extends from right to left in accordance with FIG. 1, the pad 3 which is pressed against the disk 1 advances from the right to the left in the direction of the arrow V and is moved into abutment against the base of the housing 22 by the end of the front lug 31 thereof. The guiding member 4 damps this movement by means of the hairpin-like spring and reduces or prevents the impact of the lug against the base of the housing 22 downstream and consequently the noise which would result from that impact.

Figure 2:
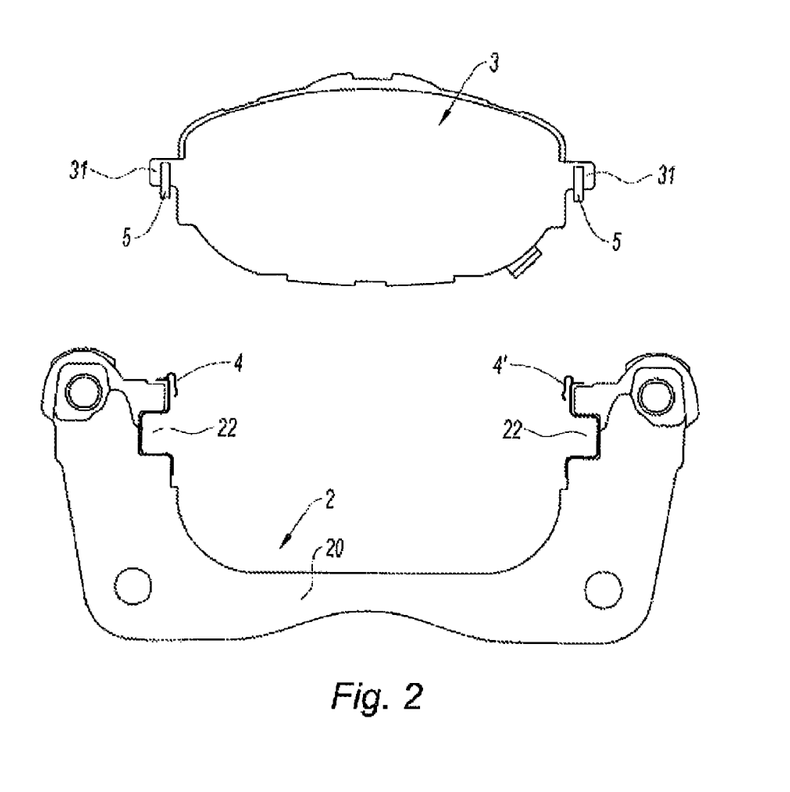
FIG. 2 is a view corresponding to FIG. 1 showing the brake pad and the cap before the brake pad is installed.

FIG. 2 is a side view of a cap 2 provided with a guiding member 4 according to the disclosure and, above the cap 2, a brake pad 3 with, at the two lugs 31 thereof provided with radial springs 5 of wound form; those springs 5 which are arranged transversely relative to the plane of FIG. 2 are engaged in the manner of pincers on the lugs 31.

Figure 3:
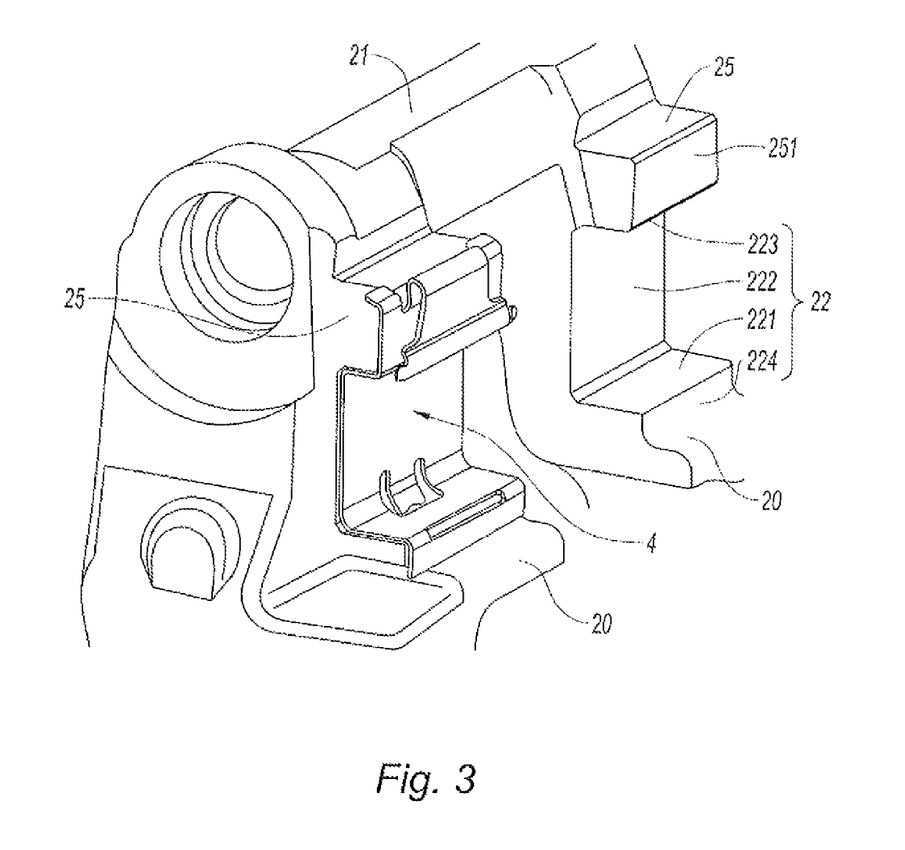
FIG. 3 is an isometric view of an end of the cap showing an end of each arm connected by a bar.

FIG. 3 is a partial isometric view of a cap 2 which shows the end of two arms 20 which are connected by the bar 21 and which allows the gap between the two arms for receiving the brake disk (not illustrated) to be seen.

That view shows the shape of the housing 22 bounded by a lower surface 222, a base 221 and an upper surface 223. The upper surface 223 is part of a stud 25 which has a front surface 251 and to which the guiding member 4 is fixed. The housing of the other arm 20 is provided with a guiding member 4 showing how the guiding member 4 is fixed to the stud 25, and moves into the housing 22 in order to then move into abutment against the front surface under the housing 22, the arm has an internal front surface 224.

Figure 4:
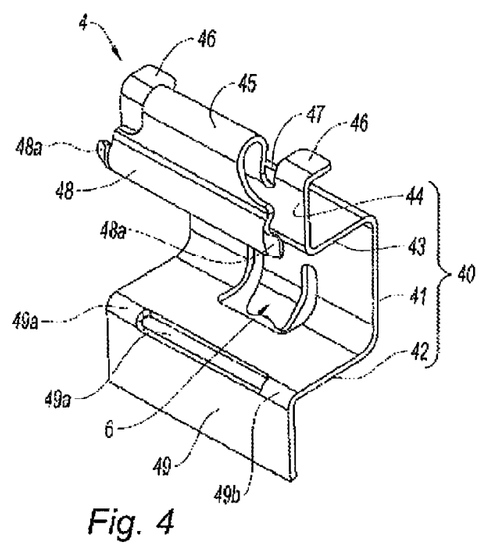
FIG. 4 is an isometric view of the guiding member according to the disclosure.

FIG. 4 shows such a guiding member 4 according to the disclosure in a non-installed position and the description makes use of the orientation conventions defined with reference to FIG. 1 by the notions "radial", "internal", "external", "lower" and "upper".

The guiding member 4 is obtained by shaping a band of spring steel. It comprises a body 40 in the form of a U on its side, having a substantially rectangular cross-section with bent corners 40a, 40b, comprising at one side a base 41 which continues downward by way of an internal radial surface 42 and, at the other side, by way of an external radial surface 43. That surface continues as an external abutment surface 44 which carries, on the one hand, a hairpin-like shock-absorbing spring 45 which is directed forward and which is bounded at each side by a lateral abutment tongue 46 which is directed toward the rear. The hairpin-like shock-absorbing spring 45 and the two abutment tongues 46 are separated by a cutout 47 at each side in order, on the one hand, to conserve the entire rigidity in the abutment tongues 46 and, on the other hand, to allow the shock-absorbing spring 45 to deploy its entire resilience.

The shock-absorbing spring 45 terminates at the front in a rounded lower edge 48 which is directed axially and which terminates at each end in an inwardly curved guiding member 48a in order to make it easier to position the brake pad 3 in the housing 22 of the arm 20 of the cap 2 which is provided with such a guiding member 4.

The internal abutment surface 49 is connected to the internal radial surface 42 by a cut-out fold 49a which extends over a large portion of the length thereof and which allows only two curved attachments 49b of material at the two ends to remain.

Finally, the internal radial surface 42 and the base 41 are provided with a locking tongue 6 which is cut out of the mass in the region of the bent corner 40b, substantially at the center of the axial length of the guiding member 4. This locking tongue 6 extends beyond the internal radial surface 42 in a downward direction (in accordance with the orientation of FIG. 4) in order to constitute an engagement member which grips the base 221 of the housing 22.

In order to promote this engagement, the front edge of the locking tongue 6 comprises two rounded portions 61 which protrude and which are separated by a recessed curved portion 62.

Figure 5:
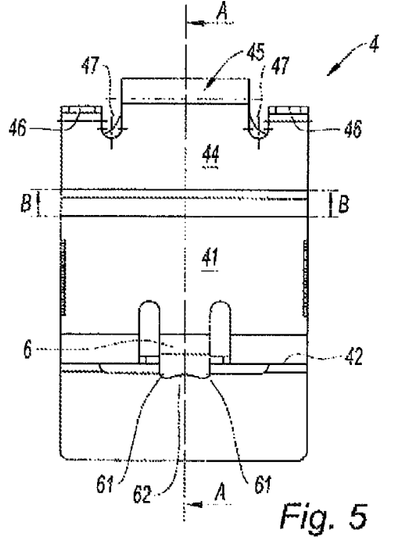
FIG. 5 is a side view of the member of FIG. 4.

FIG. 5 is a rear side view of the guiding member 4 of FIG. 4 showing the arrangement of the hairpin-like shock-absorbing spring 45 which is attached to the external abutment surface 44 and the separation of the two lateral abutment tongues 46 by means of a deep cutout 47 having a rounded base so as to disengage in a dynamic manner the shock-absorbing spring 45 and the two lateral abutment tongues 46.

That rear view also shows the shape of the locking tongue 6 and the cutout thereof from the base 41 and the internal radial surface 42 in such a manner as to allow the locking tongue 6 to fully deploy its resilience in order to become engaged in the housing 22 and to retain the guiding member 4 at that location by locking.

Figure 6:
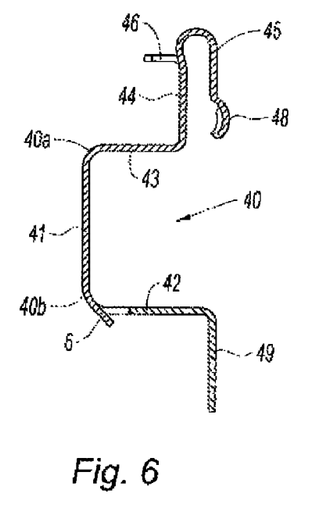
FIG. 6 is a sectional view along A-A of the spring of FIG. 5.

FIG. 6 is a cross-section of the guiding member 4 and the different component parts thereof, showing the rectangular shape of the body 40 of the guiding member and the connection of the internal radial surface 42 at right angles to the base 41 of the body by a rounded fold. The same is accordingly true of the external abutment surface 44 which extends by way of a hairpin-like shock-absorbing spring 45, at a side, that is to say, at the front side, not directed toward the cap in which that guiding member will be positioned and, at the other side, the lateral abutments 46. This Figure also shows the shape of the rounded edge 48 of the shock-absorbing spring 45 and the shape and the arrangement of the locking tongue 6.

Figure 7:
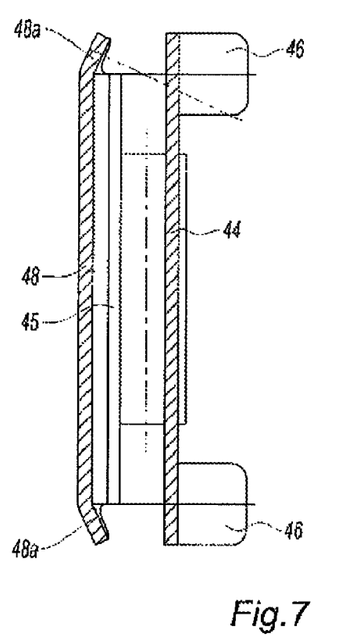
FIG. 7 is a sectional view along B-B of the spring of FIG. 5.

The cross-section of FIG. 7 taken through the guiding member 4 in the region of the rounded lower edge 48 of the shock-absorbing spring 45 emphasises the inwardly curved shape of the two ends 48a of this rounded edge 48 which act as guiding surfaces in order to receive the lug 31 of the pad which is further provided with the radial spring 5 thereof (FIG. 2).

Figure 8:
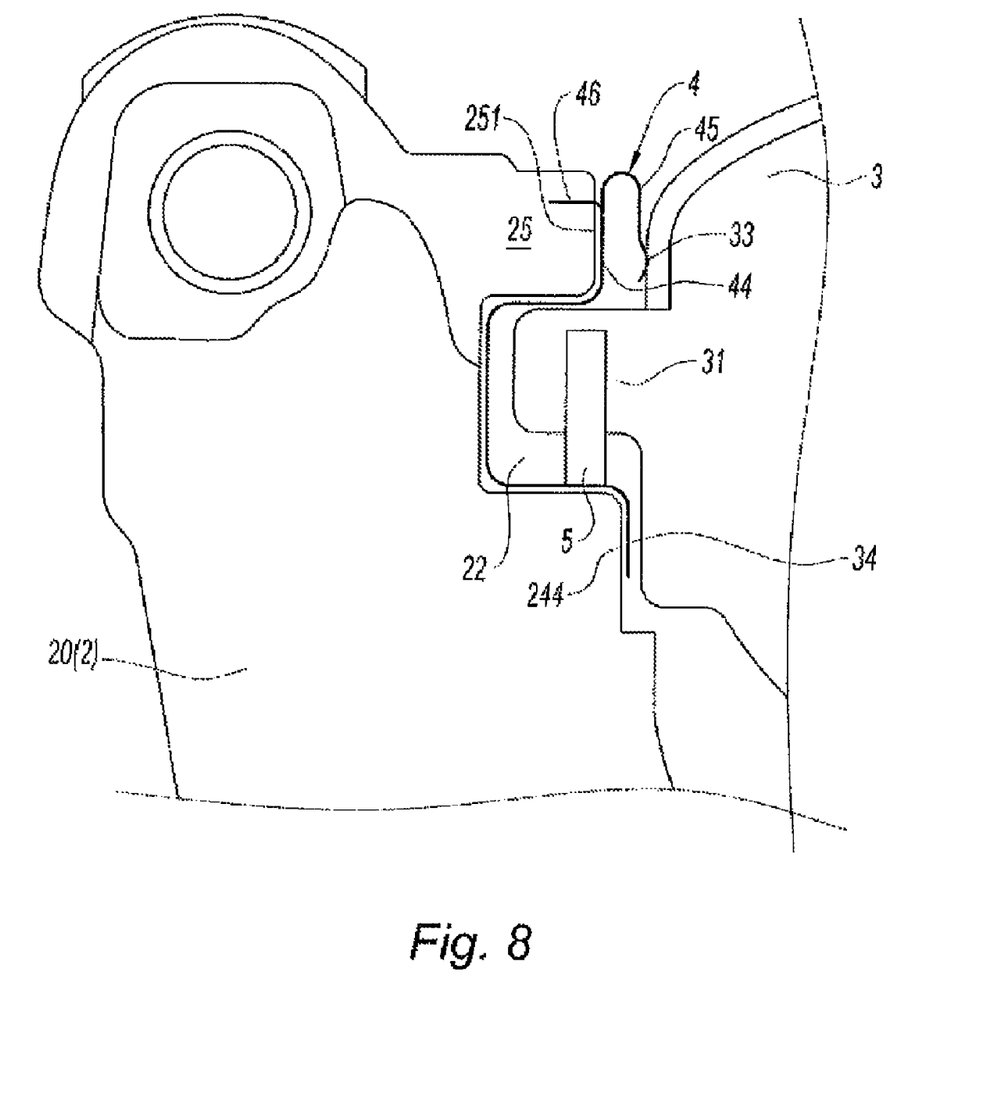
FIG. 8 is a partial side view, drawn to an enlarged scale, of the guiding member installed in the housing of the arm with the lug and the two sides of the pad bounding the lug.

FIG. 8 is a side view, drawn to an enlarged scale, of the arrangement of the upstream lug 31 of the pad 3, which lug is provided with the radial spring 5 thereof and which moves into the U-like cavity of the body 40 of the guiding member 4 which is itself previously installed in the axial housing 22 of the end of the arm 20 of the cap 2. This Figure emphasizes the positioning of the upper portion of this guiding member 4 with its external abutment surface 44 moving into abutment against the front surface 251 of the stud 25 and the two lateral abutment tongues 46 moving at one side and the other of the stud 25 and finally the hairpin-like shock-absorbing spring 45 which is curved at the side opposite the sides of the abutment tongues 46 in order to move into abutment with the rounded portion 48 thereof against the face 33 of the pad 3 above the lug 31 and to repel the pad 3 in abutment against the downstream housing of the arm in order to reduce or to eliminate any play at that location.

It should be noted that the arm is advantageously provided with a shock-absorbing spring 45 only in the upstream housing 22 whilst the downstream housing is provided with a guiding member without the shock-absorbing spring in order thereby to have maximum play between the housing 22 of the arm 20 and the lug 31 at the upstream side and practically zero play at the downstream side.

The disclosure thereby generally relates to disk brakes and automotive equipment.

LIST OF REFERENCE NUMERALS

1 disk
2 cap
20 U-like arm
21 bar
22 housing
221 base
222 lower surface
223 upper surface
224 internal front surface
25 stud
251 front surface of stud
3 pad
31 lug
33 face of pad above lug
34 face of pad under lug
4 guiding member
4' guiding member
40 body
40a, b corners/bends
41 base
42 internal radial surface
43 external radial surface
44 external abutment surface 45 shock-absorbing spring
46 lateral tongue
47 cutout
48 rounded lower edge
48a guiding member
49 internal abutment surface
49a cutout bend
49b bent attachments
5 axial spring
6 locking tongue
61 rounded edge
62 inwardly curved portion

The invention claimed is:

1. A guiding member for a disk brake pad in a cap, the cap including two generally U-shaped arms connected by two bars, each arm having at respective two ends thereof a stud and an axial housing, the axial housing including a base, a lower surface, and an upper surface which form a substantially rectangular cross-sectional area, the guiding member comprising:
a body which has a substantially U-shaped cross section that is substantially rectangular, such that the body is configured to be positioned in the axial housing, the body including:
an external radial surface configured to abut the upper surface of the axial housing;
a base configured to abut the lower surface of the axial housing;
an internal radial surface including a locking tongue configured to press against and engage the base of the axial housing;
an external abutment surface configured to abut a front surface of the stud, the external abutment surface including:
two tongues that form lateral stops extending from each side of the stud; and
a shock-absorbing spring configured such that when the body is positioned in the axial housing, the shock absorbing spring is interposed between the front surface of the stud and a face of the disk brake pad above a lug of the disk brake pad, the shock-absorbing spring including a spring arm comprising a lower surface configured to abut the face of the disk brake pad above the lug of the disk brake pad, the spring arm extending substantially parallel to the front surface of the stud, the shock-absorbing spring configured to move towards the front surface of the stud such that the lower surface of the shock-absorbing spring is resiliently pressed against the face of the disk brake pad above the lug of the disk brake pad; and
an internal abutment surface configured such that when the body is positioned in the axial housing, the internal abutment surface abuts an internal front surface of the arm and the internal abutment surface receives a face of the disc brake pad below the lug;
wherein the guiding member is formed by a folded spring steel band that is configured to be fixed to the stud and positioned in the axial housing of the arm;
wherein the guiding member is further configured such that when the body is positioned in the axial housing, the guiding member receives the lug in an axially sliding manner; and
wherein the guiding member is configured such that when the body is positioned in the axial housing, the guiding member guides and presses a radial spring of the lug.

2. The guiding member as claimed in claim 1, wherein the lower surface of the shock-absorbing spring includes a rounded axial edge configured such that when the body is positioned in the axial housing, the rounded axial edge presses against the face of the disk brake pad above the lug.

3. The guiding member as claimed in claim 1, wherein the tongues which form the lateral stops are cut from the external abutment surface at each side of the shock-absorbing spring and are bent toward the stud.

4. The guiding member as claimed in claim 1, wherein the locking tongue is formed by a cut such that the locking tongue is resiliently shaped from the base and the internal radial surface of the body, substantially at a center of an axial length of the folded spring steel band forming the guiding member.

5. The guiding member as claimed in claim 1, wherein:
the spring arm includes a rounded end, which includes the lower surface,
wherein the rounded end has a substantially cylindrical shape; and
wherein the rounded end has two guiding extensions which are curved toward a rear, and which are configured to engage the side of the disk brake pad against the rounded end of the shock-absorbing spring.

6. The guiding member as claimed in claim 1, wherein a folding edge between the internal radial surface of the body and the internal abutment surface comprises a longitudinal cutout over a large portion of an axial length thereof, such that material at ends of the longitudinal cutout form curved attachments.

7. A brake disk comprising:
a cap that has two substantially U-shaped arms connected by two bars, each arm having at each end a stud and an axial housing, the axial housing including a base, a lower surface, and an upper surface;
disk brake pads having upstream lugs; and
a guiding member for each of the upstream lugs of the brake pads, each guiding member including:
a body which has a substantially U-shaped cross section that is substantially rectangular, such that the body is configured to be positioned in the axial housing, the body including:
an external radial surface configured to abut the upper surface of the axial housing;
a base configured to abut the lower surface of the axial housing;
an internal radial surface including a locking tongue configured to press against and engage the base of the axial housing;
an external abutment surface configured to abut a front surface of the stud, the external abutment surface including:
two tongues that form lateral stops extending from each side of the stud; and
a shock-absorbing spring interposed between the front surface of the stud and a face of the disk brake pad above a corresponding upstream lug of the disk brake pad, the shock-absorbing spring configured to move towards the front surface of the stud so as to resiliently press against the face of the disk brake pad; and
an internal abutment surface configured to abut an internal front surface of the arm and configured to receive a face of the one of the disc brake pads below the corresponding upstream lug;

wherein each guiding member is formed by a folded spring steel band that is configured to be fixed to the stud and positioned in the axial housing of the arm;

wherein each guiding member is further configured to receive the corresponding upstream lug in an axially sliding manner; and wherein each of the upstream lugs includes a radial spring configured to be guided and pressed by the respective guiding member in the axial housing.

8. The guiding member as claimed in claim 7, wherein an end of the shock-absorbing spring includes a rounded axial edge configured such that when the body is positioned in the axial housing, the rounded axial edge presses against the face of the disk brake pad above the lug.

9. The guiding member as claimed in claim 7, wherein the tongues which form the lateral stops are cut from the external abutment surface at each side of the shock-absorbing spring and are bent toward the stud.

10. The guiding member as claimed in claim 7, wherein the locking tongue is formed by a cut such that the locking tongue is resiliently shaped from the base and the internal radial surface of the body, substantially at a center of an axial length of the folded spring steel band forming the guiding member.

11. The guiding member as claimed in claim 7, wherein:
the shock-absorbing spring includes a rounded end with a substantially cylindrical shape; and
the rounded end has two guiding extensions which are curved toward a rear, and which are configured to engage the side of the disk brake pad against the rounded end of the shock-absorbing spring.

12. The guiding member as claimed in claim 7, wherein a folding edge between the internal radial surface of the body and the internal abutment surface comprises a longitudinal cutout over a large portion of an axial length thereof, such that material at ends of the longitudinal cutout form curved attachments.

* * * * *

UNITED STATES PATENT AND TRADEMARK OFFICE
CERTIFICATE OF CORRECTION

PATENT NO. : 9,638,275 B2  
APPLICATION NO. : 14/357099  
DATED : May 2, 2017  
INVENTOR(S) : Bernard et al.

Page 1 of 1

It is certified that error appears in the above-identified patent and that said Letters Patent is hereby corrected as shown below:

On the Title Page

In Item (72), Inventor #3, Roger Mahoudeaux's residence should read "Le Blanc Mesnil (FR)"

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*